(12) United States Patent  
Sprague

(10) Patent No.: US 7,671,834 B2  
(45) Date of Patent: Mar. 2, 2010

(54) ELECTRIC WRITABLE MEDIA

(75) Inventor: Robert A. Sprague, Saratoga, CA (US)

(73) Assignee: Xerox Corporation, Norwalk, CT (US)

( * ) Notice: Subject to any disclaimer, the term of this patent is extended or adjusted under 35 U.S.C. 154(b) by 807 days.

(21) Appl. No.: 11/198,171

(22) Filed: Aug. 8, 2005

(65) Prior Publication Data

US 2007/0030252 A1   Feb. 8, 2007

(51) Int. Cl.  
    *G09G 3/34*  (2006.01)
(52) U.S. Cl. ............... 345/107; 345/173; 345/179
(58) Field of Classification Search ........... 345/107, 345/173, 179, 84  
See application file for complete search history.

(56) References Cited

U.S. PATENT DOCUMENTS

| 5,604,027 | A | 2/1997 | Sheridon |
| 5,723,204 | A | 3/1998 | Stefik |
| 6,222,513 | B1 * | 4/2001 | Howard et al. ............ 345/84 |
| 6,456,272 | B1 * | 9/2002 | Howard et al. ........... 345/107 |
| 6,518,949 | B2 | 2/2003 | Drzaic |
| 2004/0008189 | A1 * | 1/2004 | Clapper et al. .......... 345/179 |
| 2005/0078096 | A1 * | 4/2005 | Fan ...................... 345/179 |

* cited by examiner

*Primary Examiner*—Amr Awad  
*Assistant Examiner*—Yong Sim  
(74) *Attorney, Agent, or Firm*—Pillsbury Winthrop Shaw Pittman LLP

(57) ABSTRACT

An electric writable medium having islanded surface structures operationally configured to avoid tribocharging of the electric writable medium.

13 Claims, 2 Drawing Sheets

ELECTRIC WRITABLE MEDIA

BACKGROUND

Disclosed is an electrical writable media having an islanded surface structure suitable for avoiding tribocharging. The electrical writable media may be a visual display or an electric paper. The islanded surface structure of the electrical media is operatively constructed to permit writing, erasing and no alteration of an image by using a stylus.

Various types of electric writable media, commonly known as electric paper, exist in the prior art. One example of electric paper includes a polymer substrate and bichromal anisotropic particles, such as balls or cylinders that are in suspension with an enabling fluid and are one color, such as white, on one side and a different color, such as black, on the other. Examples of such electric paper are described in U.S. Pat. No. 5,723,204 to Stefik and U.S. Pat. No. 5,604,027 to Sheridon, each of which is incorporated herein by reference in its entirety. Under the influence of an electric field, the particles rotate so that either the white side or the black side is exposed.

Another type of electric writable media is known as an electronic ink display, such as the one described in U.S. Pat. No. 6,518,949 to Drzaic, which is incorporated herein by reference. An electronic ink display includes at least one capsule filled with a plurality of particles, made of a material such as titania, and a dyed suspending fluid. When a direct-current electric field of an appropriate polarity is applied across the capsule, the particles move to a viewed surface of the display and scatter light. When the applied electric field is reversed, the particles move to the rear surface of the display and the viewed surface of the display then appears dark.

Yet another type of electric writable media, also described in U.S. Pat. No. 6,518,949 to Drzaic, includes a first set of particles and a second set of particles in a capsule. The first set of particles and the second set of particles have contrasting optical properties, such as contrasting colors, and can have, for example, differing electrophoretic properties. The capsule also contains a substantially clear fluid. The capsule has electrodes disposed adjacent to it connected to a voltage source, which may provide an alternating-current field or a direct-current field to the capsule. Upon application of an electric field across the electrodes, the first set of particles moves toward a first electrode, while the second set of particles moves toward a second electrode. If the electric field is reversed, the first set of particles moves toward the second electrode and the second set of particles moves toward the first electrode. Other examples of writable media include liquid crystal, non-encapsulated electrophoretic displays and other displays.

It has been well proven that electrostatic writing can be done on an erasable electric writable medium by swiping an array of electrodes across the surface with a printer-like motion, depositing charge on the surface in an image wise fashion. The charge, once deposited, places a voltage across the medium and causes it to change its electro-optic condition, for example, by rotating or twisting anisotropic particles, such as bichromal balls, or otherwise affecting a medium.

In one electrostatic display, there are used islanded structures of isolated conductive material on the top surface of the electric writable medium with associated display elements, such as rotatable balls having different colored surfaces. Such an islanded electric display is described in U.S. Pat. No. 6,222,513 to Howard et al. In such embodiment, the islands of conductive material act as a conducting surface for charge deposition that does not tribocharge with the writing array of electrodes and distributes the charge across each pixel in a relatively uniform manner.

There has recently been an effort to write on such islanded media with a single point stylus, much like a pen, which deposits charge on the surface causing the balls to rotate in a manner such that the desired color is displayed to the viewer. Attempts to perform stylus writing on electric writable media have generally focused on trying to perform one or more of three functions with the stylus: (1) writing on the electric writable media by applying a voltage with the stylus that rotates the affected rotatable elements or otherwise changes the affected portion of the medium from a background level, such as white, to a written level, such as black; (2) erasing the electric writable media by applying a voltage with the stylus that rotates the rotatable elements from a written level to a background level; and (3) moving the stylus on the electric writable media without affecting the disposition of the rotatable elements, thus enabling mouse-like action of the stylus. Unfortunately, the ability to achieve the functions of writing, erasing, and moving the stylus, as well as preventing the electric writable medium from "smudging" due to accidental contact with a stylus user's hand, has been difficult to achieve because of tribocharging caused by the motion of the stylus and/or the user's hand.

FIG. 1 depicts a cross-sectional view of an prior art electric writable medium 100. Electric writable medium 100 includes a conventional islanded structure of conductive material 102, 102' and a cross-sectional view of a stylus 104 having a tip 108 with a radius of curvature R. Electric writable medium 100 is constructed of isolated conductive islands 102, 102' placed on top of an insulating material 106 that are separated by a distance S. The thickness of isolated conductive islands 102, 102', indicated by reference character H, is typically designed to be very thin. As a result, when the stylus tip 108 traces across the surface of the electric writable medium 100, it contacts both the conductive islanded material 102, 102' and the insulating material 106, thereby rendering the air gap between the stylus tip 108 and insulating material 106 to zero. As a result, significant tribocharging of the electric writable medium 100 occurs as charges are stripped from the surfaces of the stylus 104 and the insulating material 106 and deposited on the surface of the conductive islands 102, 102'. This undesired charge transfer dominates the writing impact and inhibits the switching of the anisotropic particles in the electric writable medium 100. Moreover, if a user's hand rubs across the surface, the hand's motion can also produce a tribocharge that causes an undesirable smudge across the background.

Therefore, a need exists for an electric writable medium that permits stylus writing, erasing and/or moving without significant tribocharging.

Furthermore, a need exists for methods of writing on, erasing from and moving around, an electric writable media using a stylus.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to a "rotatable element" is a reference to one or more rotatable elements and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

Aspect disclosed herein include electric writable media system comprising a charged stylus and writeable media comprising multichromal twistable or rotatable elements, such as multichromal beads, positioned in association with a plurality of conductive islands, the conductive islands being located along at least one surface of the electric writable media and separated by insulating substrate, wherein the conductive islands are sized to avoid tribocharging of the electric writable media when the multichromal elements are twisted or rotated by the charged stylus when it is moved over the electric writable media; and electric writable media system, comprising a writeable media comprising a layer of insulating material and a plurality of islands of conductive material located on said insulating material, and a writing stylus having a charged tip, wherein each of said each islands of conductive material is separated from each other by the insulating material, and wherein each of said islands of conductive material is shaped and configured to prevent the writing stylus tip from contacting the insulating material when the stylus is used to write on said writeable media; and a writing system comprising an electric writable medium having a front surface on which writing may be effectuated by contacting said surface with a charged element and a back surface, and comprising a charged stylus having a conductive tip attached to a voltage source, wherein the voltage source of the stylus has a ground reference contacted to the back surface of the electric writable medium; and a method of writing with a electrical stylus on an electric writable medium having a writable-surface and a non-writable surface comprising multichromal electrically twistable or rotatable image member(s), the method comprising applying a positive stylus voltage at a tip of the stylus, grounding the tip of the stylus to the non-writable surface of the electric writable medium, contacting the tip of the stylus to the writable surface of the writable medium, setting the voltage differential between the positive stylus voltage and the ground to be greater than a threshold voltage for rotating or twisting the image member(s); and a method of erasing with a electrical stylus on an electric writable medium having a writeable surface and a non-writeable surface comprising multichromal electrically twistable or rotatable image member(s), the method comprising applying a positive stylus voltage at a tip of the electrical stylus, grounding the non-writable surface of the electric writable media, contacting the writable surface of the electric writable medium with the tip of electrical stylus, and controlling the voltage differential between the negative stylus voltage and ground such that the voltage differential is greater than a threshold voltage for rotating or twisting the image member(s) in the electric writable medium; and a method of globally erasing an electric writable medium having a writable surface and a non-writable surface and having a multichromal electrically twistable or rotatable image member(s) on the writable surface comprising applying a negative stylus voltage to a erase bar, grounding the erase bar to the non-writable surface of the electric writable medium; contacting the writable surface of the electric writable medium with the erase bar, causing the voltage differential between the voltage of the erase bar and ground to be greater than the threshold voltage for rotating or twisting the image member(s) in the electric writable medium.

Various aspects and applications of the present invention will become apparent to the skilled artisan upon consideration of the brief description of the figures and the detailed description of the invention which follows.

BRIEF DESCRIPTION OF THE DRAWINGS

Aspects, features, benefits and advantages of the embodiments of the present invention will be apparent with regard to the following description and accompanying drawings where.

DETAILED DESCRIPTION

Figure 1:
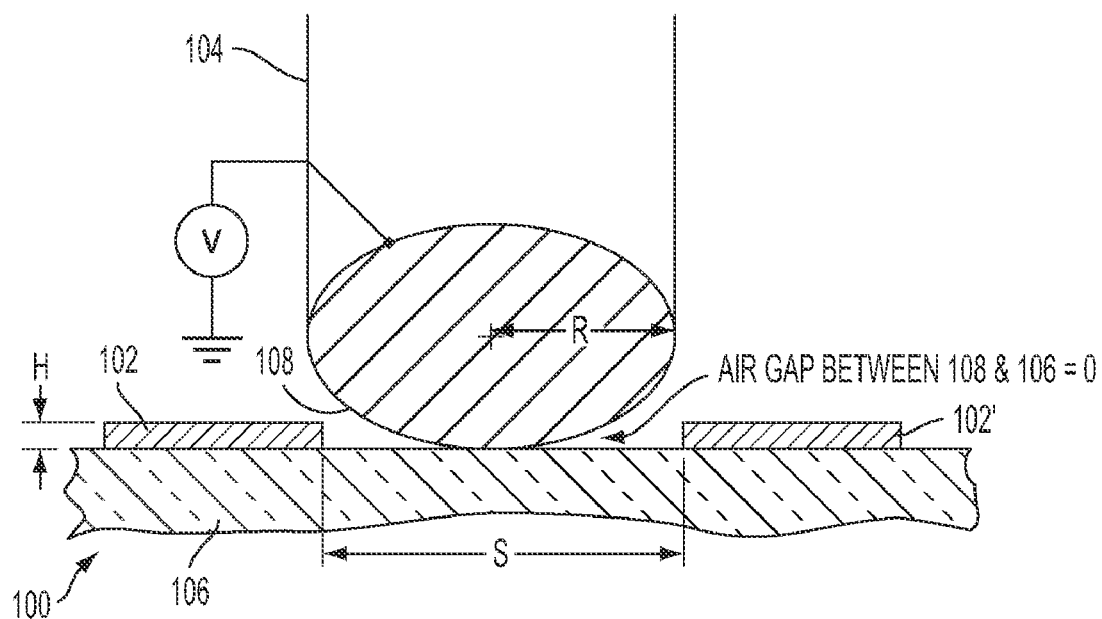
FIG. 1 depicts a cross-sectional view of a prior art electric writable medium including a conventional islanded structure and a cross-sectional view of a stylus.

In embodiments there is illustrated:

electric writable media system comprising a charged stylus having a tip and writeable media comprising multichromal twistable or rotatable elements, such as multichromal beads, positioned within a plurality of conductive islands, the conductive islands being located along at least one surface of the electric writable media and separated by insulating substrate, wherein the conductive islands are sized to avoid tribocharging of the electric writable media when the multichromal elements are twisted or rotated by the charged stylus when it is moved over the electric writable media;

Tribocharging involves the release of electrons by a first surface and the attraction of those electrons to a second surface when the first and second surfaces are rubbed together or one surface is drawn across the other. The effect of tribocharging is to deposit a charge on one of the surfaces as a result of such interaction.

In the case of electric writable media, a deposited charge may interfere with the subsequent application of a voltage across an electric writable medium. As a result, reducing or eliminating the effects of tribocharging in an electric writable medium may be a desired result. To avoid tribocharging, the thickness of the conductive islanded surfaces of the media and distance between conductive islands may be selected with respect to the radius of curvature of a charged writing stylus such that the charged surface of the stylus can not touch the insulator surface between adjacent conductive islands.

In an embodiment, an electric writable media system includes a layer including a first material, a plurality of islands each located on the same side of the layer and including a second material, and a stylus. Each island may be separated from each of its closest neighboring islands by a substantially equal distance. Moreover, such distances may be substantially equal for every island. Furthermore, each island may have a thickness sufficient to prevent the stylus from contacting the layer. The first material may be an insulating material. The second material may be a conductive material.

In an embodiment, a stylus for an electric writable medium includes a pen-shaped implement having a conductive point that contacts the top surface of the electric writable medium during the writing process. The tip of the implement may be electrically connected to a voltage source producing a voltage sufficient to cause a change in the medium, such as the twisting or rotating of bichromal or multichromal balls in the medium, when applied to the top surface. Current flowing from the implement to the conductive island when the two are in contact during the writing process produces the voltage on the top surface. The current may flow because a voltage differential may be produced between the implement and an electrode on the back surface of the electronic writable medium.

In an embodiment, a method of writing on an electric writable medium comprising a a charge rotatable element includes applying a stylus voltage at a tip of a stylus, grounding an electric writable medium, and contacting the electric writable medium with the tip of the stylus. For writing, the voltage differential between the stylus voltage and ground is greater than a threshold voltage for rotating the rotatable element in the electric writable medium.

Figure 2:
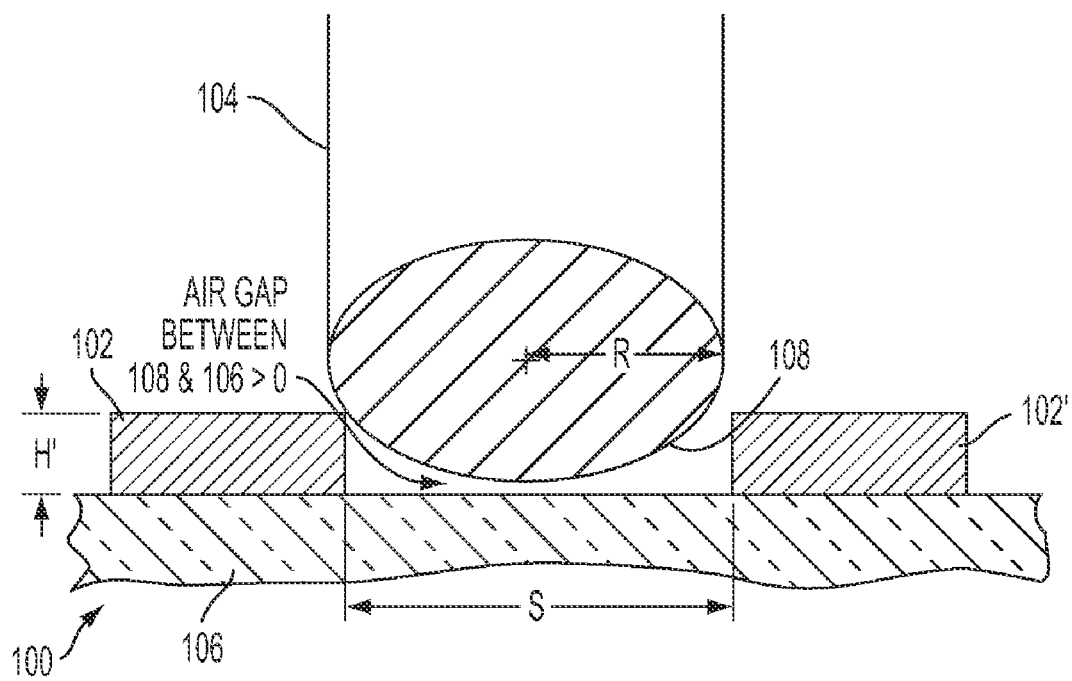
FIG. 2 depicts a cross-sectional view of an electric writable medium including an islanded structure according to an embodiment described herein, along with a cross-sectional view of a stylus.

FIG. 2 depicts a cross-sectional view of an electric writable medium 100 including an islanded structure 102, 102' along with a cross-sectional view of a stylus 104, in accordance with an embodiment of the present invention. It will be appreciated that like reference characters correspond to similar features depicted in FIG. 1. As such, FIG. 2 illustrates that the thickness of the islanded structure 102, 102' is increased from the conventional thickness H to thickness H'. That is, the increased thickness H' of the islanded structure 102, 102' may be selected to be of a sufficient height, as compared to the radius of curvature of the tip of the stylus 108, so that the stylus tip 108 cannot touch the insulating surface 106 between adjacent islands 102, 102'. When the following equations are satisfied, the combination of the stylus 104 and the islanded structure 102, 102' may be used to create a electric writable medium 100 that does not generate a significant tribocharge:

H'=increased thickness of each of the islands 102, 102'
R=radius of curvature of stylus tip 108
S=spacing between islands
Sag of pen<$(S/2^2)^2/(2*R)$ Thus, the radius of curvature R of the stylus tip 108 should comply with:

$$R > (S/2)^2/(2*H')$$

which defines the working region of operation for the present invention. Similarly, it will be appreciated that the increased thickness H' of the islanded structure 102, 102' may be designed so that $H' > (S/2)^2/(2*R)$. If the combination of the stylus 104 and the islanded structure 102, 102' is designed within these constraints, the air gap between stylus tip 108 and insulating surface 106 is greater than zero. In other words, the stylus tip 108 may only touch the conductive islands and may not significantly tribocharge the surface of the electric writable medium 100. As a result, successful operation of the stylus' writing, erasing, and moving functions may result.

In an embodiment, writing on the electric writable medium 100 (e.g., switching rotatable elements from a background color to a written color) may be performed by applying a stylus voltage of $V_B$, which is greater than a threshold voltage for rotating the rotatable elements, at the tip of the stylus 104 and contacting the electric writable medium, which is at a ground potential voltage. Erasing the electric writable medium 100 (e.g., switching rotatable elements from a written color to a background color) may be performed by applying a stylus voltage of $V_W$, which is greater than a threshold voltage for rotating the rotatable elements, at the tip of the stylus 104 and contacting the electric writable medium. Moving the stylus 104 across the electric writable medium 100 without changing the image may be performed by applying a voltage that does not exceed a threshold voltage differential for rotating a rotatable element at the tip of the stylus.

In addition, embodiments may permit smudge free operation when the electric writable medium 100 is contacted by a user's hand. The user's hand tends to be grounded through the user's body (or through a conductive contact to a tethered stylus). Thus, when only the user's hand touches a conductive island 102, 102' the island may be brought to approximately a ground potential voltage. Assuming that the sag of a user's hand between conductive islands 102, 102' is less than or equal to the sag of the stylus 104, the result of the movement of a user's hand across the electric writable medium 100 may be approximately the same as moving the stylus 104 across the electric writable medium in that the voltage differential would be insufficient to cause rotation in a rotatable element in the absence of substantial tribocharging.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. An electric writable media system comprising:
   a stylus having a curved tip, wherein the curved tip is generally hemispherical in shape and the lowermost point of the tip is curved;
   a writeable media comprising multichromal twistable or rotatable elements positioned in association with a plurality of conductive islands, the conductive islands being located along at least one surface of the electric writable media and separated from each other by an insulating substrate;
   wherein the spacing of the conductive islands and the size and configuration of the conductive islands and the curved tip of the stylus are such that the curved tip of the stylus when in contact with the conductive islands is precluded from contacting the insulating substrate and is maintained spaced apart therefrom to avoid tribocharging of the electric writable media when the multichromal elements are twisted or rotated by the charged stylus when it is moved over the electric writable media,
   wherein the thickness of each conductive island is greater than half of the distance between neighboring conductive islands squared divided by two times the radius of curvature of the tip of the stylus.

2. The system of claim 1 wherein the tip of the stylus is charged.

3. The system of claim 2 wherein the tip of the stylus is connected to a voltage source.

4. The system of claim 3 wherein the voltage source has a ground reference contacted to a surface of the electric writable media not containing the conductive islands.

5. The system of claim 1 wherein the conductive islands are positioned on top of said insulating material.

6. An electric writable media system comprising:
a stylus having a curved tip, wherein the curved tip is generally hemispherical in shape and the lowermost point of the tip is curved;
a writeable media comprising multichromal twistable or rotatable elements positioned in association with a plurality of conductive islands, the conductive islands being located along at least one surface of the electric writable media and separated from each other by an insulating substrate;
wherein the spacing of the conductive islands and the size and configuration of the conductive islands and the curved tip of the stylus are such that the curved tip of the stylus when in contact with the conductive islands is precluded from contacting the insulating substrate and is maintained spaced a art therefrom to avoid tribocharging of the electric writable media when the multichromal elements are twisted or rotated by the charged stylus when it is moved over the electric writable media,
wherein a sag of the tip of the stylus as compared to the conductive islands is less than half of the distance between conductive islands squared divided by two times the radius of curvature of the tip of the stylus.

7. The system of claim 1 wherein multichromal twistable or rotatable elements are bichromal.

8. The system of claim 7 wherein the twistable or rotatable elements are black and white balls.

9. The system of claim 1 wherein each island is separated from each of its closest neighboring islands by a substantially equivalent distance.

10. A method of writing on an electric writable medium with an electronic stylus, comprising:
applying a positive voltage at a curved tip of a stylus, wherein the curved tip is generally hemispherical in shape and the lowermost point of the tip is curved;
grounding a back surface of the electric writable medium; and
contacting a top surface of the electric writable medium with the tip of the stylus,
maintaining the voltage differential between the positive stylus voltage and ground greater than a threshold voltage for rotating a rotatable element in the electric writable medium,
wherein the top surface includes a plurality of conductive islands spaced apart on an insulating substrate,
the spacing of the conductive islands and the size and configuration of the conductive islands and the curved tip of the stylus are such that the tip of the curved stylus when in contact with the conductive islands is precluded from contacting the insulating substrate and is maintained spaced apart therefrom to avoid tribocharging of the electric writable media when the multichromal elements are twisted or rotated by the charged stylus when it is moved over the electric writable media, and
wherein the thickness of each conductive island is greater than half of the distance between neighboring conductive islands squared divided by two times the radius of curvature of the tip of the stylus.

11. The method of claim 9 wherein the electric writable medium back surface is a non-writable surface.

12. The method of claim 9 wherein the electric writable medium front surface is a writable surface of the electric writable medium.

13. A method of locally erasing an electric writable medium, comprising:
applying a negative stylus voltage at a curved tip of a stylus, wherein the curved tip is generally hemispherical in shape and the lowermost point of the tip is curved;
grounding a back surface of an electric writable medium; and
contacting a top surface of the electric writable medium with the tip of the stylus, the top surface including a plurality of conductive islands spaced apart on an insulating substrate and, the spacing of the conductive islands and the size and configuration of the conductive islands and the curved tip of the stylus are such that the tip of the curved stylus when in contact with the conductive islands is precluded from contacting the insulating substrate and is maintained spaced apart therefrom to avoid tribocharging of the electric writable media when the multichromal elements are twisted or rotated by the charged stylus when it is moved over the electric writable media, and
wherein the voltage differential between the negative stylus voltage and ground is greater than a threshold voltage for rotating a rotatable element in the electric writable medium,
wherein the thickness of each conductive island is greater than half of the distance between neighboring conductive islands squared divided by two times the radius of curvature of the tip of the stylus.

* * * * *